(12) United States Patent
Kimura et al.

(10) Patent No.: US 6,768,864 B1
(45) Date of Patent: Jul. 27, 2004

(54) RECORDING AND REPRODUCING APPARATUS COMPRESSING REPRODUCED INFORMATION

(75) Inventors: Atsushi Kimura, Saitama-ken (JP); Wataru Morita, Saitama-ken (JP); Megumi Hashiotani, Saitama-ken (JP); Eriko Shimizu, Saitama-ken (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/384,982

(22) Filed: Aug. 30, 1999

(30) Foreign Application Priority Data

Sep. 2, 1998 (JP) .......................................... P10-248414

(51) Int. Cl.[7] ................................................. H04N 5/76
(52) U.S. Cl. ...................................... 386/111; 386/112
(58) Field of Search ............................... 386/33, 45, 1, 386/46, 64, 111–112, 109, 125, 126, 52; 360/8; 375/240, 240.01; 348/384.1; H04N 5/76, 5/92, 9/79, 5/781, 7/12

(56) References Cited

U.S. PATENT DOCUMENTS 4,489,351 A  * 12/1984 d'Alayer de Costemore d'Arc .......................... 386/118

5,287,420 A    2/1994   Barrett
5,335,116 A    8/1994   Onishi et al.

FOREIGN PATENT DOCUMENTS

| DE | 43 13 177 | 10/1993 |
| EP | 0 627 858 | 12/1994 |
| EP | 0 762 756 | 3/1997 |
| WO | WO 98/11547 | 3/1998 |

OTHER PUBLICATIONS

T. Kweh et al., "Rate control algorithm for block–based variable rate video encloders", *Electronic Letters*, vol. 32, No. 14, Jul. 4, 1996, pp. 1277–1278.

* cited by examiner

Primary Examiner—Thai Tran
(74) Attorney, Agent, or Firm—Young & Thompson

(57) ABSTRACT

An information recording and reproducing apparatus (S) is provided with: a reproducing device (8) for reproducing information, which is recorded on a record medium (9) in advance; a compressing device (5, 6) for compressing the reproduced information to reduce an information amount of the reproduced information and generating a compression information; and a recording device (8) for re-recording the generated compression information onto the record medium.

5 Claims, 7 Drawing Sheets

RECORDING AND REPRODUCING APPARATUS COMPRESSING REPRODUCED INFORMATION

BACKGROUND OF THE INVENTION

1. Field of the Invention

The present invention relates to an information recording and reproducing apparatus which can reproduce information from a record medium such as an optical disc and the like and re-record the reproduced information onto the original record medium.

2. Description of the Related Art

A home video tape recorder enables a television broadcast to be easily recorded.

For example, in case of recording a television broadcast such as a television drama which is broadcasted once a week and has a content successive in the respective broadcast times, video tapes are preparedly recorded with only the television drama successive in all the weekly broadcast times, and they are kept in the broadcasted order.

However, in order to record and keep the television drama successive in all the weekly broadcast times, it is necessary that the video tapes have the total length in which all the successive broadcasts can be recorded. At this time, it is necessary to keep a vast amount of video tapes, depending on the condition. This results in a problem that a cost is expensive and also a wide space is needed as a storage space.

As a method of reducing the amount of the video tapes necessary for the storage, for example, it may be considered to compress the broadcast program, which is once recorded and reproduced, and thereby drop a record rate (actually, in a case of a video tape recorder, a tape recorded at a standard mode is converted into a tape of a triple mode) and re-record it onto the video tape dedicated to the storage. However, this method needs two video recorders for reproducing the recorded broadcast program and for re-recording it. Thus, this method also has a problem that a cost is expensive and an unnecessary time for the reproducing and recording operation is necessary.

SUMMARY OF THE INVENTION

The present invention is proposed in view of the above mentioned problems. It is therefore an object of the present invention to provide an information recording and reproducing apparatus which can re-record a recorded broadcast program and the like onto a storage record medium in a relatively easy and space-saving manner, and which can reduce a usage amount (or the number of uses) of the storage record medium.

The above object of the present invention can be also achieved by an information recording and reproducing apparatus provided with: a reproducing device for reproducing information, which is recorded on a record medium such as an optical disc in advance; a compressing device such as a video encoder, an audio encoder etc., for compressing the reproduced information to reduce an information amount of the reproduced information and generating a compression information; and a recording device for re-recording the generated compression information onto the record medium.

According to the present invention, since the reproduced information is re-recorded as the compression information after the compressing process, it is possible to reduce the area on the record medium which is required for re-recording the information after the reproducing process. Thus, it is possible to reduce the number of the record mediums required for the preservation of the information. Further, it is possible to re-record the information without using two apparatuses i.e., the information reproducing apparatus and the information recording device. Thus, it is possible to prevent the apparatus from unnecessarily occupying the installation space, and to produce the record medium dedicated for the preservation of the information.

In one aspect of the present invention, an information recording and reproducing apparatus is further provided with a storing device such as a buffer for temporarily storing the reproduced information and successively outputting the stored information to the compressing device.

According to this aspect, since the reproduced information is temporarily stored into the storing device and is sequentially read out therefrom, the compression information can be continuously generated so as to re-record the compression information even if the search of the reproduction position is required when reproducing the information.

In another aspect of the present invention, an information recording and reproducing apparatus is further provided with a storing device such as a buffer for temporarily storing the generated compression information and successively outputting the stored information to the recording device.

According to this aspect, since the generated compression information is temporarily stored into the storing device, is sequentially read out therefrom and is re-recorded, the information can be continuously reproduced even if the search of the record position is required when re-recording the compression information.

In another aspect of the present invention, an information recording and reproducing apparatus is further provided with a controlling device such as a CPU for controlling the recording device to re-record the generated compression information onto the record medium at a record position, which is within an already-recorded area on the record medium where the reproduced information has been recorded.

According to this aspect, it is possible to re-record the compression information while reproducing the information even if there exists no non-recorded area (where the reproduced information has never been recorded) on the record medium when the original information is recorded.

In this aspect, the controlling device may control the recording device to start re-recording from a lead of the already-recorded area.

In this case, it is possible to re-record the compression information by efficiently using the recordable area on the record medium.

In another aspect of the present invention, an information recording and reproducing apparatus is further provided with a controlling device such as a CPU for controlling the recording device to re-record the generated compression information onto the record medium at a record position, which is within a non-recorded area on the record medium where the reproduced information has never been recorded.

According to this aspect, since the compression information can be recorded while the reproduced information remains (i.e., not erased or overwritten) on the record medium, it is possible to resume the compression process etc., by reproducing again the information to be compressed even if an occurrence of a power failure in the middle of the compression process etc., of the information causes the compression process to be interrupted.

In another aspect of the present invention, an information recording and reproducing apparatus is further provided with a controlling device such as a CPU for controlling the recording device to (i) temporarily record the generated compression information onto the record medium at a record position, which is within a non-recorded area on the record medium where the reproduced information has never been recorded, (ii) record the temporarily recorded compression information onto the record medium at a record position, which is within an already-recorded area on the record medium where the reproduced information has been recorded when the reproducing device finishes reproducing the information larger by a predetermined amount than the temporarily recorded compression information, and (iii) then record the compression information, which is newly generated by the compressing device, onto the record medium at a record position, which is within an area on the record medium where the temporarily recorded compression information has been temporarily recorded.

According to this aspect, since the newly generated compression information is recorded in the area where the temporarily recorded compression information has been temporarily recorded, it is possible to record the compression information even if there does not exist a sufficient original non-recorded area on the record medium. Further, since the temporarily recorded compression information is re-recorded into the already-recorded area where the pertinent reproduced information has been recorded when the reproducing device finishes reproducing the information larger by a predetermined amount than the temporarily recorded compression information, the information, which has been just reproduced, is not erased or overwritten by recording the compression information thereon right after the pertinent information is reproduced. It is possible to resume the compression process etc., by reproducing again the information to be compressed even if an occurrence of a power failure in the middle of the compression process etc., of the information causes the compression process to be interrupted.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENT

Preferred embodiments of the present invention will be explained below with reference to the drawings.

In the following embodiments, the present invention is applied to an information recording apparatus, which can record an externally inputted information (including both of video information and audio information) with respect to an optical disc serving as a record medium capable of recording the information a plurality of times and reproducing the recorded information (actually, for example, an optical disc capable of recording and reproducing a plurality of times the information by the same format as the DVD-RAM (DVD-Random Access Memory), the so-called MD (Mini Disc) or the DVD-ROM (DVD-Read Only Memory)), and which can reproduce this information from the optical disc.

(I) First Embodiment

At first, a first embodiment according to the present invention will be described below with reference to FIGS. 1 to 3.

The configuration and schematic operation of an information recording and reproducing apparatus of the first embodiment are firstly explained with reference to FIG. 1.

Figure 1:
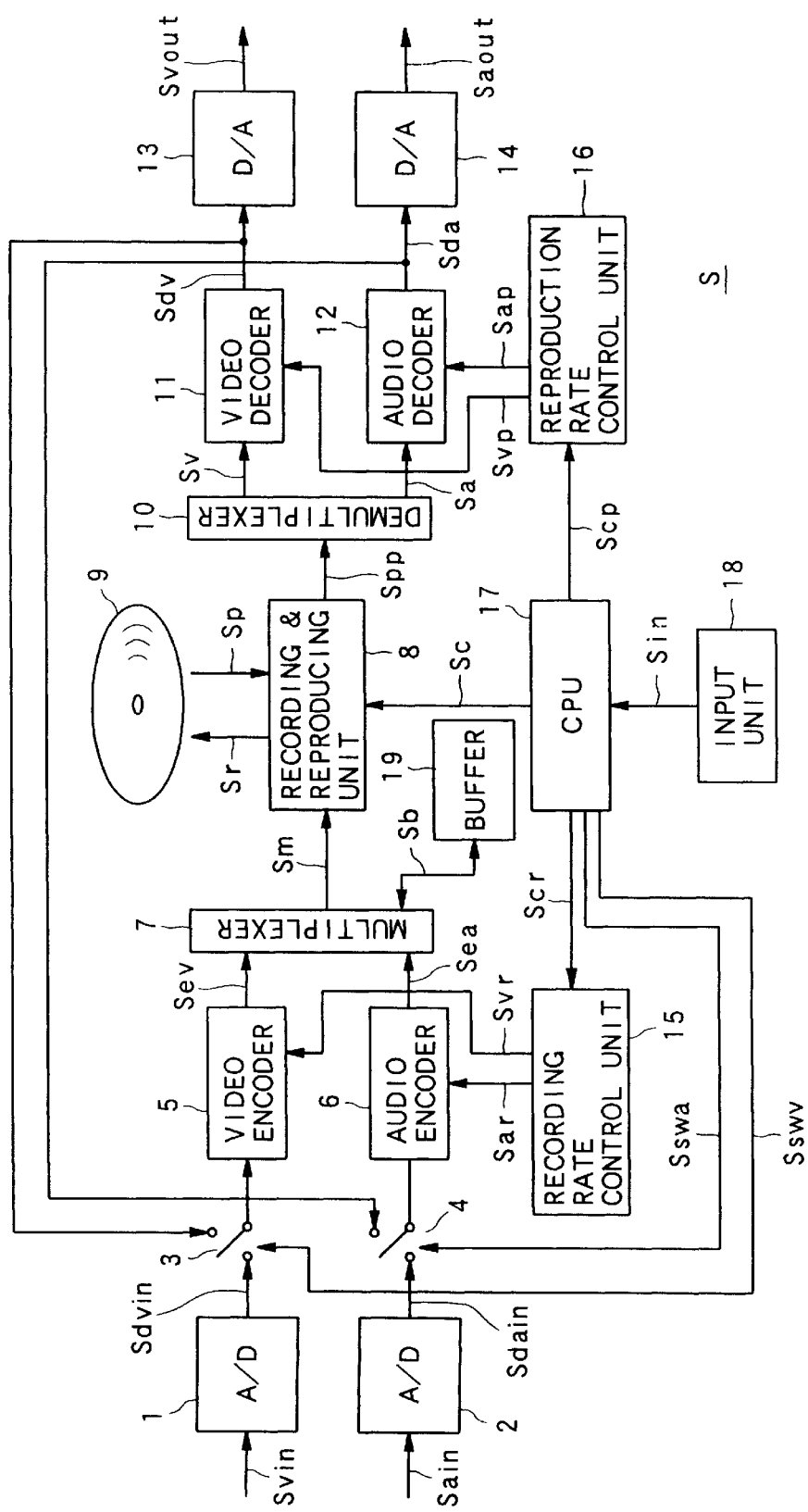
FIG. 1 is a block diagram showing a schematic configuration of an information recording and reproducing apparatus related to embodiments of the invention.

FIG. 1 is a block diagram showing the schematic configuration of the information recording and reproducing apparatus of the first embodiment.

As shown in FIG. 1, an information recording and reproducing apparatus S of the first embodiment is provided with: A/D converters 1 and 2; switches 3 and 4; a video encoder 5 serving as a compressing device; an audio encoder 6 serving as a compressing device; a multiplexer 7; a recording and reproducing unit 8 serving as a recording device and a reproducing device; a demultiplexer 10; a video decoder 11; an audio decoder 12; D/A converters 13 and 14; a recording rate control unit 15; a reproduction rate control unit 16; a CPU 17 serving as a controlling device; an input unit 18; and a buffer 19 serving as a storing device.

At this time, the video encoder 5 is designed so as to compress an inputted digital video signal Sdvin described later, at a compression rate specified by a rate control signal Svr described later, and then generate a video encode signal Sev described later.

On the other hand, the audio encoder 6 is designed so as to compress an inputted digital audio signal Sdain described later, at a compression rate specified by a rate control signal Sar described later, and then generate an audio encode signal Sea.

The video decoder 11 is designed so as to expand an inputted reproduction video signal Sv, at an expansion rate specified by a rate control signal Svp described later, and then generate a demodulation video signal Sdv described later.

On the other hand, the audio decoder 12 is designed so as to expand an inputted reproduction audio signal Sa described later, at an expansion rate specified by a rate control signal Sap described later, and then generate a demodulation audio signal Sda described later.

The schematic operation will be described below.

At first, the operation in case of recording the externally-inputted video information and audio information onto an optical disc 9 is explained.

When an operation to instruct recording the externally-inputted video information and audio information is carried out by the input unit 18 and then an input signal Sin corresponding to this is outputted to the CPU 17, the CPU 17 generates a control signal Sswv to switch the switch 3 to the side of the A/D converter 1 and then outputs it to the switch 3, and further generates a control signal Sswa to switch the switch 4 to the side of the A/D converter 2 and then outputs it to the switch 4.

When a video signal Svin including the video information to be recorded onto the optical disc 9 is externally inputted, the A/D converter 1 digitizes it, and then outputs it as the digital video signal Sdvin through the switch 3 to the video encoder 5.

Then, the video encoder 5 encodes the video information included in the digital video signal Sdvin (namely, modulates and converts it into a record format) in accordance with the rate control signal Svr from the recording rate control unit 15, and then generates the video encode signal Sev, and further outputs it to the multiplexer 7.

At this time, when the digital video signal Sdvin including the externally-inputted video information is encoded, the recording rate control unit 15 generates the rate control signal Svr so as to encode the video information without compressing the video information, and then outputs it to the video encoder 5.

In parallel with this, when the audio signal Sain including the audio information to be recorded onto the optical disc 9 is externally inputted, the A/D converter 2 digitizes it, and then outputs it as the digital audio signal Sdain through the switch 4 to the audio encoder 6.

Then, the audio encoder 6 encodes the audio information included in the digital audio signal Sdain, in accordance with the rate control signal Sar from the recording rate control unit 15, and then generates the audio encode signal Sea, and further outputs it to the multiplexer 7.

At this time, when the digital audio signal Sdain including the externally-inputted audio information is encoded, the recording rate control unit 15 generates the rate control signal Sar so as to encode the audio information without compressing the audio information, and further outputs it to the audio encoder 6.

Then, the multiplexer 7 multiplexes or superimposes the video encode signal Sev and the audio encode signal Sea on each other, and then outputs it to the recording and reproducing unit 8 as a multiplex signal Sm including the information to be recorded onto the optical disc 9.

At this time, the multiplexer 7 transiently outputs the generated multiplex signal Sm as a buffer signal Sb to the buffer 19, and stores it in the buffer 19, and then reads it out at a predetermined timing, to thereby output it to the recording and reproducing unit 8.

The recording and reproducing unit 8 converts the inputted multiplex signal Sm into a record signal Sr to be actually recorded on the optical disc 9, in accordance with a control signal Sc from the CPU 17, and then uses the record signal Sr to modulate the strength of a record light beam, to thereby generate an information pit corresponding to the record signal Sr on the optical disc 9 i.e., actually record the information to be recorded onto the optical disc 9.

At this time, a position on the optical disc 9 at which the information to be recorded is actually recorded is specified by the control signal Sc from the CPU.

On the other hand, in parallel with the above mentioned series of recording operations, in accordance with the input signal Sin from the input unit 18 operated by a user, the CPU 17 outputs the respective control signals Sswa, Sswv and Sc and controls the recording operations, and further outputs a control signal Scr and controls the recording rate control unit 15, and accordingly instructs it to control the encoding process in the video encoder 5 and the audio encoder 6.

Next, the operation in a case of reproducing the information recorded on the optical disc 9 is explained.

When the operation to instruct reproducing the information recorded on the optical disc 9 is carried out by the input unit 18 and then the input signal Sin corresponding thereto is inputted to the CPU 17, the CPU 17 generates the control signal Sc to reproduce the information, and further outputs it to the recording and reproducing unit 8.

Accordingly, the recording and reproducing unit 8 irradiates a light beam for reproducing the information onto the optical disc 9 at a reproduction position, and then performs a process, such as a wave form generation, amplification and the like, with respect to a read signal Sp corresponding to the reproduction information generated on the basis of a reflection light thereof, and further generates a reproduction signal Spp and outputs it to the demultiplexer 10.

At this time, the reproduction position on the optical disc 9 at which the reproduction information is recorded is specified by the control signal Sc from the CPU.

In accordance with the reproduction signal Spp, the demultiplexer 10 separates and generates the reproduction video signal Sv corresponding to the video information included in the reproduction signal Spp and the reproduction audio signal Sa corresponding to the audio information included in the reproduction signal Spp, and then outputs them to the video decoder 11 and the audio decoder 12, respectively.

In accordance with a reproduction rate specified by the rate control signal Svp from the reproduction rate control unit 16, the video decoder 11 decodes (i.e., demodulates) the reproduction video signal Sv, and then generates the demodulation video signal Sdv, and further outputs it to one terminal of the switch 3 and the D/A converter 13.

The D/A converter 13 converts the inputted demodulation video signal Sdv into an analog form, and then generates a video output signal Svout, and further outputs it to an external monitor, display or the like (not shown). By this, the video included in the reproduced information is displayed on the monitor, display or the like.

On the other hand, in accordance with the reproduction rate specified by the rate control signal Sap from the reproduction rate control unit 16, the audio decoder 12 decodes (i.e., demodulates) the reproduction audio signal Sa, generates the demodulation audio signal Sda, and then outputs it to one terminal of the switch 4 and the D/A converter 14.

The D/A converter 14 converts the inputted demodulation audio signal Sda into an analog form, generates an audio output signal Saout, and then outputs it to an external speaker (not shown). Accordingly, the audio included in the reproduced information is outputted from the speaker.

In the above-mentioned operations, the reproduction rate control unit 16 specifies the reproduction rate so as to correspond to the record rate specified by the recording rate control unit 15, in accordance with the control signal Scp from the CPU 17 (namely, so as to demodulate the reproduced reproduction video signal Sv and reproduction audio signal Sa without expanding them, if the external video information and the like are recorded on the optical disc 9 without compression), and then generates the rate control signals Svp and Sap, respectively.

Moreover, in parallel with the series of reproducing operations, the CPU 17 outputs the above mentioned control signals Sc and controls the reproducing operations, in accordance with the input signal Sin from the input unit 18 operated by the user, and also outputs the control signal Scp and controls the reproduction rate control unit 16, and further instructs it to control the decoding process in the video decoder 11 and the audio decoder 12.

Next, the operation in case of carrying out a re-recording operation according to the present invention will be described below.

In the re-recording operation of the present invention, the video information and the audio information reproduced by the above-mentioned operations are compressed to be re-record onto the optical disc 9.

That is, in the re-recording operation, when an operation to instruct re-recording is carried out by the input unit 18 and then the input signal Sin corresponding thereto is inputted, the CPU 17 generates the control signal Sswv to switch the switch 3 to the side of the demodulation video signal Sdv and outputs it to the switch 3. Also, the CPU 17 generates the control signal Sswa to switch the switch 4 to the side of the demodulation audio signal Sda and outputs it to the switch 4.

Accordingly, the switches 3 and 4 are switched to the side of the demodulation video signal Sdv and the side of the demodulation audio signal Sda, respectively.

Then, when the video encoder 5 receives the reproduced demodulation video signal Sdv through the switch 3, the video encoder 5 compresses it by using the compression rate included in the rate control signal Svr from the recording rate control unit 15, and then generates the video encode signal Sev including the compressed video information, and further outputs it to the multiplexer 7.

On the other hand, when the audio encoder 6 receives the reproduced demodulation audio signal Sda through the switch 4, the audio encoder 6 compresses it by using the compression rate included in the rate control signal Sar from the recording rate control unit 15, and then generates the audio encode signal Sea including the compressed audio information, and further outputs it to the multiplexer 7.

At this time, the CPU 17 generates the control signal Scr indicative of the compression rate received by the input unit 18, and accordingly controls the recording rate control unit 15 so as to generate the rate control signal Sar and the rate control signal Svr including the compression rate.

The multiplexer 7 multiplexes or superimposes the video encode signal Sev and the audio encode signal Sea on each other and generates the multiplex signal Sm by using the operation similar to the above-mentioned recording operation, and then outputs it to the recording and reproducing unit 8.

The recording and reproducing unit 8 records the record signal Sr corresponding to the multiplex signal Sm, onto the optical disc 9 at a record position included in the control signal Sc from the CPU 17.

At this time, the CPU 17 generates the control signal Sc so that the record signal Sr is recorded (re-recorded) at a later-described record position (refer to an address "0" etc., on a right side of FIG. 3).

Due to the above-mentioned re-recording operation, the once-reproduced video information and audio information are re-recorded on the optical disc 9 after the compression of the respective information and the reduction of the data amounts.

In addition, if the video information re-recorded as mentioned above is reproduced, the reproduction video signal Sv and the reproduction audio signal Sa are expanded by the video decoder 11 and the audio decoder 12, at the expansion rates corresponding to the compression rates respectively used in the video encoder 5 and the audio encoder 6. After that, they are outputted and reproduced as the demodulation video signal Sdv and the demodulation audio signal Sda respectively.

At this time, the CPU 17 controls the reproduction rate control unit 16 in order to generate the rate control signals Svp and Sap so that the expansions are carried out at the expansion rates corresponding to the compression rates.

Next, the details of the re-recording operation according to the first embodiment will be described below with reference to FIGS. 2 and 3.

Figure 2:
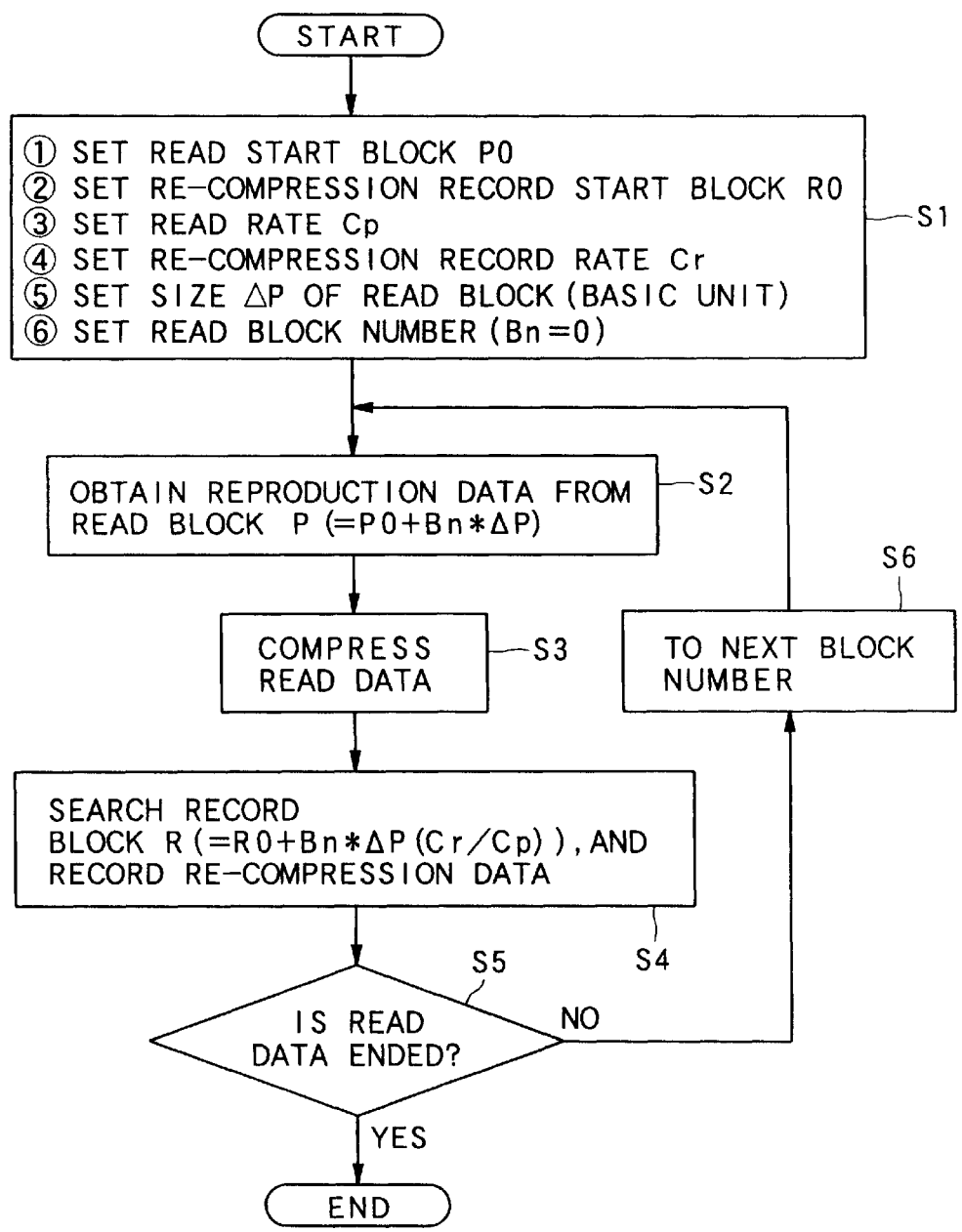
FIG. 2 is a flowchart showing a re-recording operation of a first embodiment of the present invention.

FIG. 2 is a flowchart showing the re-recording operation of the first embodiment. FIG. 3 is a diagrammatic view showing the record states of the information on the optical disc 9 before and after the re-recording operation of the first embodiment.

In the explanation of the first embodiment and other embodiments described later, a minimum unit by which the information is recorded on the optical disc 9 or the information is read out from the optical disc 9 is tentatively referred to as a "block". Here, as corresponding to this block, a so-called ECC (Error Correcting Code) block may be actually considered, which is used as the minimum unit when the information is recorded onto and reproduced from, for example, the CD (Compact Disc) and the like.

Moreover, in the first embodiment described below, it is assumed that the information including the video information and the audio information is recorded in advance on the optical disc 9 for each block.

As shown in FIG. 2, in the re-recording operation of the first embodiment, when the operation to instruct re-recording is firstly carried out by the input unit 18, the CPU 17 receives the input signal Sin corresponding to this instruction, and then carries out various initial settings (Step S1).

As an initial value actually set at this step S1, a read start block indicating a position of a lead block of the information to be re-recorded within the information already recorded on the optical disc 9 is firstly set as "P0".

Next, a re-compression record start block indicating a record start position when the read block is re-recorded after the compression is set as "R0".

In the first embodiment, the read start block P0 and the re-compression record start block R0 are set coincident to each other.

Then, a read rate Cp is set which is a rate when the already-recorded information is read out by the recording and reproducing unit 8.

For example, a value of about 8 Mbps is proper as an actual value of this read rate Cp.

A re-compression record rate Cr which is a rate when the compressed information is re-recorded onto the optical disc 9 is set in accordance with a value set by the user in the input unit 18.

This re-compression record rate Cr is set to be a value smaller than the read rate Cp. Actually, for example, a value of about 2 Mbps is proper as this re-compression record rate Cr.

Moreover, a size (i.e., an information amount within the block) ΔP of one block to be read out from the optical disc 9 (hereafter, it is merely referred to as a read block) is firstly set to a size of the information already recorded on the optical disc 9.

Finally, a read block number Bn indicating the serial number of the already-read block is set as "0".

After the initial settings of the above-mentioned various values (Step S1), the recording and reproducing unit 8 reads out the information from a $p^{th}$ read block at the read rate Cp.

It is reproduced by the demultiplexer 10, the video decoder 11 and the audio decoder 12. Then, the reproduction data (i.e., the demodulation video signal Sdv and the demodulation audio signal Sda) are obtained (Step S2).

Here, the serial number P of the read block is a value actually given by a following expression (1).

$$P=P0+Bn \times \Delta P \tag{1}$$

When later-described steps S2 to S6 are executed, the information to be re-recorded is sequentially read out from a lead thereof.

In addition, a position of the $p^{th}$ read block at the step S2 is specified by the control signal Sc.

When the reproduction data is generated, the generated reproduction data are compressed by using the video encoder 5 and the audio encoder 6 to thereby generate the video encode signal Sev and the audio encode signal Sea respectively (Step S3).

Here, the compression rates used at the step S3 (i.e., the compression rates specified as the rate control signals Sar and Svr) are set to be compression rates at which within a necessary time identical to a necessary time when one block is read out at the step S2, all information within the one block can be re-recorded onto the optical disc 9 at the re-compression record rate Cr.

After the completion of the compression of the information (Step S3), the record signal Sr (the multiplex signal Sm) corresponding to the compressed information is re-recorded at a position of the $R^{th}$ record block (hereafter, this implies a block in the re-recorded information) (Step S4).

Here, the serial number R of the record block is a value actually given by a following expression (2).

$$R=R0+Bn \times \Delta P \times (Cr/Cp) \tag{2}$$

When the later-described steps S5 and S6 are executed, the compressed information to be re-recorded (Step S3) is sequentially re-recorded from a lead of a record position of the original information before the read out operation.

In addition, a position of the $R^{th}$ record block at the step S4 is specified by the control signal Sc.

Then, it is judged whether or not all the information to be read out is ended (Step S5). If it is ended (Step S5 ; YES), the process is ended as it is. On the other hand, if it is not ended (Step S5; NO), the read block number Bn is incremented (Step S6), and the operational flow returns back to the step S2. Then, the above-mentioned steps S2 to S6 are repeated for a next read block.

When the re-recorded information is re-reproduced, the reproduction rate control unit 16 controls the expansion rates in the video decoder 11 and the audio decoder 12 so that the demodulation can be carried out at the reproduction rate corresponding to the re-compression record rate Cr.

The record states of the information on the optical disc 9 before and after the execution of the re-recording operation through the process shown in FIG. 2 will be described below with reference to FIG. 3.

Figure 3:
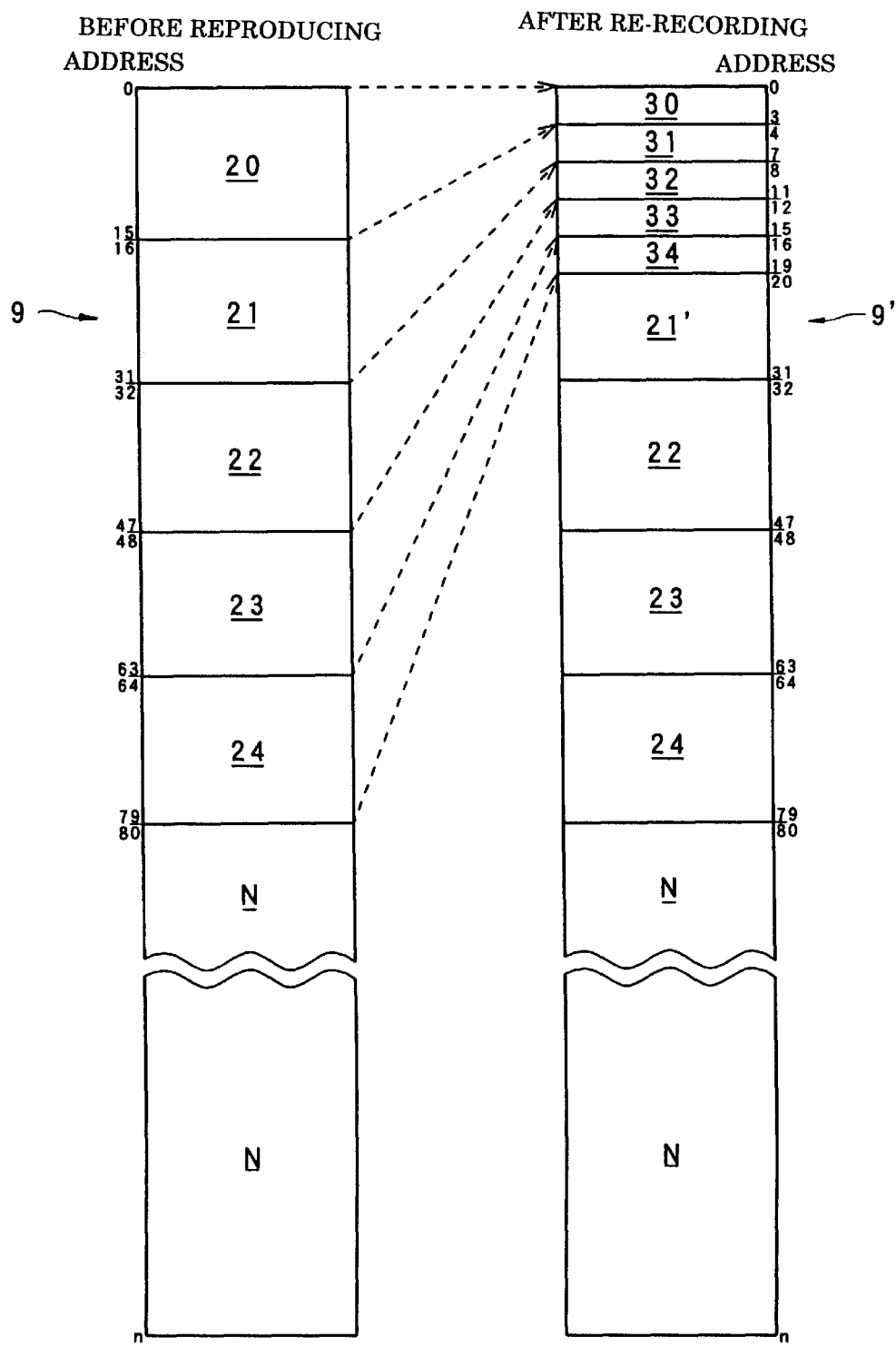
FIG. 3 is a diagram showing the record states of information before and after the re-recording operation of the first embodiment.

At first, it is assumed that on the left side of FIG. 3, five read blocks 20 to 24 are recorded on the addresses shown in FIG. 3, respectively, on the optical disc 9 before the re-recording operation. In addition, a symbol "N" in FIG. 3 indicates a non-recorded area in which no information is recorded on the optical disc 9.

When the processes at the steps S1 to S6 are performed for each read block in the state shown on the left side of FIG. 3 for each read block, since the read start block P0 and the re-compression record start block R0 are coincident to each other in the first embodiment, record blocks 30 to 34 including the compressed information (although they include the information having the contents same as those of the read blocks 20 to 24 before the respective corresponding compressions, the information amounts thereof are respectively ¼ by the compression processes) are re-recorded at the addresses on an optical disc 9' shown on a right side of FIG. 3, sequentially from a lead position of the original read block 20.

As described above, according to the operations of the information recording and reproducing apparatus S in the first embodiment, the reproduced information is re-recorded after the compression. Thus, it is possible to reduce the area on the optical disc 9 required to re-record the information after the reproduction.

Also, the information can be re-recorded without using two recorders i.e., both of the information reproducing apparatus and the information recording apparatus. Hence, the optical disc 9 for the information storage can be manufactured without the unnecessary occupation of the installation space.

Moreover, since one recording and reproducing unit 8 reproduces the information and re-records the information after the compression, this can miniaturize the information recording and reproducing apparatus S.

Furthermore, while the information after the compression is temporarily stored in the buffer 19, it is read out and re-recorded. Thus, even if the search of the record position is required when the information after the compression is recorded, it is possible to successively reproduce the information before the compression.

Also, the record position is controlled such that recording the information after the compression is started from the lead of the area on the optical disc 9 in which the reproduced information is recorded. Thus, the information after the compression can be re-recorded by effectively using the record area on the optical disc 9.

Moreover, since the record medium used for the re-recording operation is the optical disc 9, it is possible to minimize the space required to storage the information.

(II) Second Embodiment

A second embodiment which is another embodiment according to the present invention will be described below with reference to FIG. 4.

Figure 4:
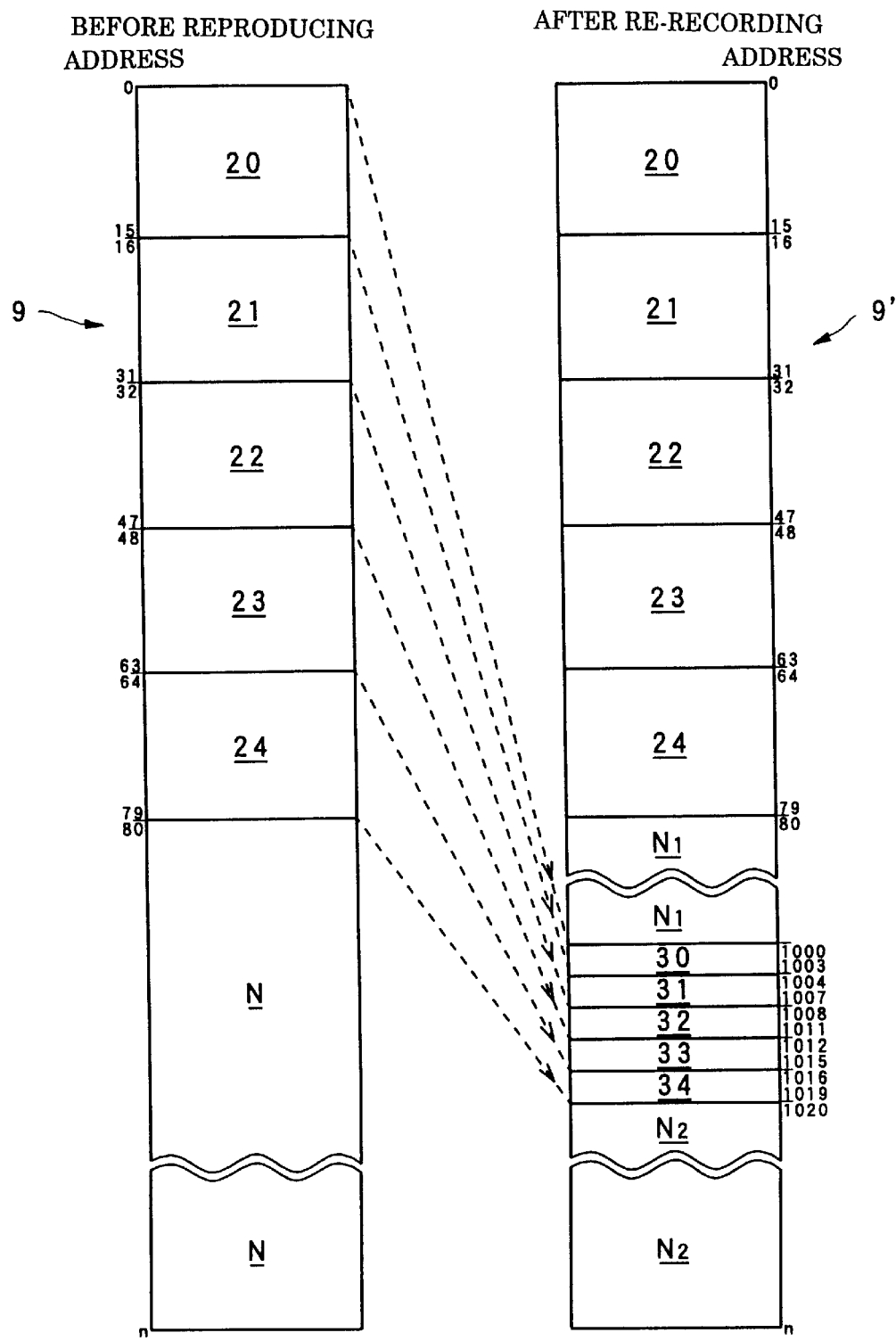
FIG. 4 is a diagram showing the record states of information before and after a re-recording operation of a second embodiment of the present invention.

FIG. 4 is a diagrammatic view showing the record states of information on the optical disc 9 before and after the re-recording operation of the second embodiment.

In the first embodiment, the case is described in which the lead position of the information firstly recorded on the optical disc 9 is coincident to the lead of the position at which the information after the compression is re-recorded. In contrast, in the second embodiment, the information after the compression is re-recorded within an empty area of the optical disc 9 in the condition that the information is firstly recorded on the optical disc 9.

In addition, the configuration of an information recording and reproducing apparatus in the second embodiment is same as that of the information recording and reproducing apparatus S in the first embodiment, and the explanation of the detailed portions thereof is omitted.

The difference between the re-recording operation of the second embodiment and the re-recording operation of the first embodiment is as follows. That is, in the re-recording operation of the first embodiment, the read start block P0 and the re-compression record start block R0 are set to be coincident to each other, as shown at the step S1 of FIG. 2. However, in the second embodiment, the re-compression record start block R0 is defined as any position within the non-recorded area on the optical disc 9 before the re-recording operation.

The other parts of the re-recording operation in the second embodiment are similar to those of the re-recording operation in the first embodiment shown in FIG. 2. Thus, the explanation of the detailed portions is omitted.

Next, the record states of the information on the optical disc 9 before and after the execution of the re-recording operation in the second embodiment will be described below with reference to FIG. 4.

At first, on a left side of FIG. 4, it is assumed that five read blocks 20 to 24 are respectively recorded at the addresses shown in FIG. 4, similarly to the first embodiment, on the optical disc 9 before the re-recording operation.

In addition, symbols "N", "N1" and "N2" in FIG. 4 respectively indicate non-recorded areas in which no information is recorded on the optical disc 9 or 9'.

When the re-recording operation in the second embodiment is performed for each read block in the state shown on the left side of FIG. 4 for each read block, since in the second embodiment, the re-compression record start block R0 is set as a position within the non-recorded area N on the optical disc 9 before the re-recording operation (i.e., in FIG. 4, as a position indicated by an address "1000"). Thus, the record blocks 30 to 34 including the compressed information are re-recorded at the addresses on the optical disc 9' shown on a right side of FIG. 4, sequentially from the position of the address "1000" within the non-recorded area N on the original optical disc 9.

As described above, according to the operations of the information recording and reproducing apparatus S in the second embodiment, the reproduced information is re-recorded after the compression. Thus, it is possible to reduce the area on the optical disc 9 required to re-record the information after the reproduction.

Also, the information can be re-recorded without using two recorders i.e., both the information reproducing apparatus and the information recording apparatus. Hence, the optical disc 9 for the information storage can be manufactured without the unnecessary occupation of the installation space.

Moreover, since one recording and reproducing unit 8 reproduces the information and re-records the information after the compression, this can miniaturize the information recording and reproducing apparatus S.

Furthermore, while the information after the compression is temporarily stored in the buffer 19, it is read out and re-recorded. Thus, even if the search of a record position is required when the information after the compression is recorded, it is possible to successively reproduce the information before the compression.

The record position is controlled so as to re-record the information after the compression within the non-recorded area N in which the original information is not recorded on the optical disc 9. Thus, while the reproduced information is left on the optical disc 9', the information after the compression can be re-recorded. Hence, even if an occurrence of a power failure in the middle of the compression process of the information causes the compression process to be interrupted, the information to be compressed can be again reproduced (in the case shown in FIG. 4, the read blocks 20 to 24) to then resume the compression process.

Moreover, since the record medium used for the re-recording operation is the optical disc 9, it is possible to minimize the space required to storage the information.

(III) Third Embodiment A third embodiment which is another embodiment according to the present invention will be described below with reference to FIGS. 5 and 6.

Figure 5:
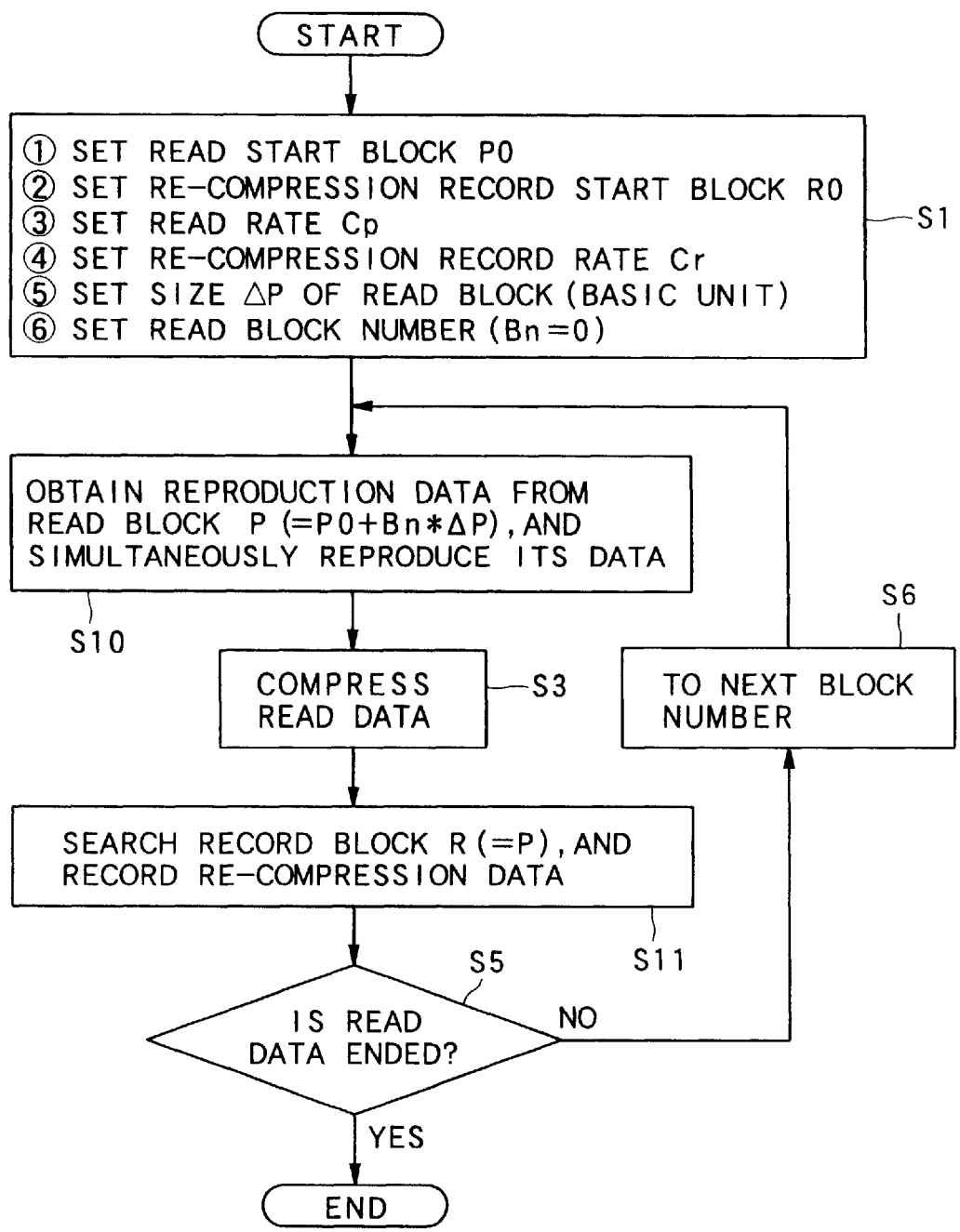
FIG. 5 is a flowchart showing a re-recording operation of a third embodiment of the present invention.
Figure 6:
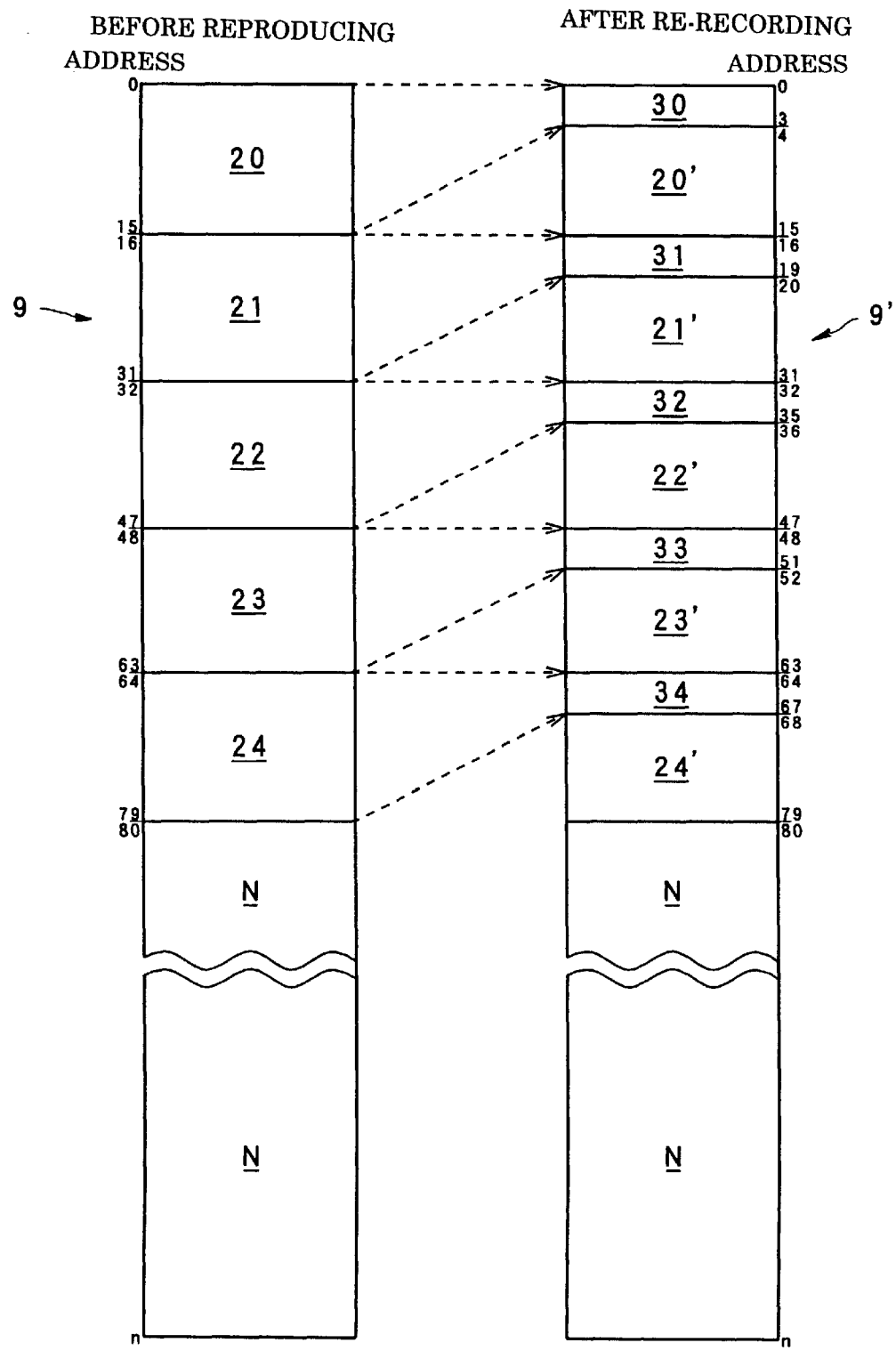
FIG. 6 is a diagram showing the record states of information before and after the re-recording operation of the third embodiment.

FIG. 5 is a flowchart showing a re-recording operation of the third embodiment, and FIG. 6 is a diagrammatic view showing the record states of information on the optical disc 9 before and after the re-recording operation of the third embodiment.

In FIG. 5, the same step numbers are given for the processes same as those shown in FIG. 2, and the explanation of the detailed portions is omitted.

In addition, the configuration of an information recording and reproducing apparatus in the third embodiment is same as that of the information recording and reproducing apparatus S in the first embodiment. Thus, the explanation of the detailed portions is omitted.

In the first embodiment, the case is described in which the lead position of the information firstly recorded on the optical disc 9 and the lead of the position at which the information after the compression is re-recorded are coincident to each other, and then the information after the compression is collectively re-recorded on one location. In contrast, in the third embodiment, the information after the compression is discretely re-recorded for each corresponding original read block, and further the re-recording operation of the information after the compression and the reproduction output of the read information are executed simultaneously and parallel to each other.

That is, the initial setting process similar to that of the first embodiment is firstly executed in the re-recording operation of the third embodiment (Step S1).

Then, similarly to the step S2 of the first embodiment, the recording and reproducing unit 8 reads the information at the read rate Cp from the $P(=P0+Bn \times \Delta P)^{th}$ read block, and then reproduces it by using the demultiplexer 10, the video decoder 11 and the audio decoder 12, and thereby obtains the reproduction data (actually, the demodulation video signal Sdv and the demodulation audio signal Sda), and further converts the obtained demodulation video signal Sdv and demodulation audio signal Sda into the analog forms respectively, and then outputs them as the video output signal Svout and the audio output signal Saout (Step S10).

Then, at a step S3, the read information is compressed similarly to the first embodiment.

After the compression of the information for each read block, a record signal Sr (the multiplex signal Sm) corresponding to the compressed information is re-recorded at a position of the $R^{th}$ record block (Step S11).

Here, the number R of this record block is actually a value indicated by a following expression (3).

$$R=P \qquad (3)$$

When later-described steps S5 and S6 are executed, the record block in the compressed information to be re-recorded (Step S3) is re-recorded at the lead of the record position for each read block before the original read operation.

In addition, the position of the $R^{th}$ record block at the step S11 is specified by the control signal Sc.

After that, the steps S5 and S6 similar to those of the first embodiment are executed, and the above-mentioned operations are executed for each read block.

Next, the record states of the information on the optical disc 9 before and after the execution of the re-recording operation through the process shown in FIG. 5 will be described below with reference to FIG. 6.

At first, it is assumed that on a left side of FIG. 6, five read blocks 20 to 24 are recorded at the addresses shown in FIG. 6, respectively, on the optical disc 9 before the re-recording operation, similarly to the above-mentioned embodiments. In addition, a symbol "N" in FIG. 6 indicates a non-recorded area in which no information is recorded on the optical disc 9.

When the re-recording operation of the third embodiment is performed for each read block in the state shown on the left side of FIG. 6 for each read block, since a record block R and a read block P are coincident to each other in the third embodiment, the record blocks 30 to 34 including the compressed information are re-recorded at the addresses on the optical disc 9' shown on a right side of FIG. 6, from each lead position of the original respective read blocks 20 to 24.

At this time, the information at the lead portions within the original read blocks 20 to 24 is re-written as can be understood from the right side of FIG. 6. Thus, the remaining portions except the respective lead portions of the read blocks 20 to 24 are left on the optical disc 9' after the re-recording operation, as read blocks 20' to 24'.

Here, as for the read blocks 20' to 24', recording new information or information after a new compression in the areas can improve a usage efficiency of the optical disc 9', and accordingly reduce the area on the optical disc 9' required to record the information.

As described above, according to the re-recording operation of the third embodiment, the corresponding record block is re-recorded for each read block in the original information, from the lead position thereof. Thus, the information after the compression can be re-recorded even if there is not a time margin of shifting a irradiation position of a reproducing light beam in reproducing the original information.

(IV) Fourth Embodiment

A fourth embodiment which is another embodiment according to the present invention will be described below with reference to FIG. 7.

Figure 7:
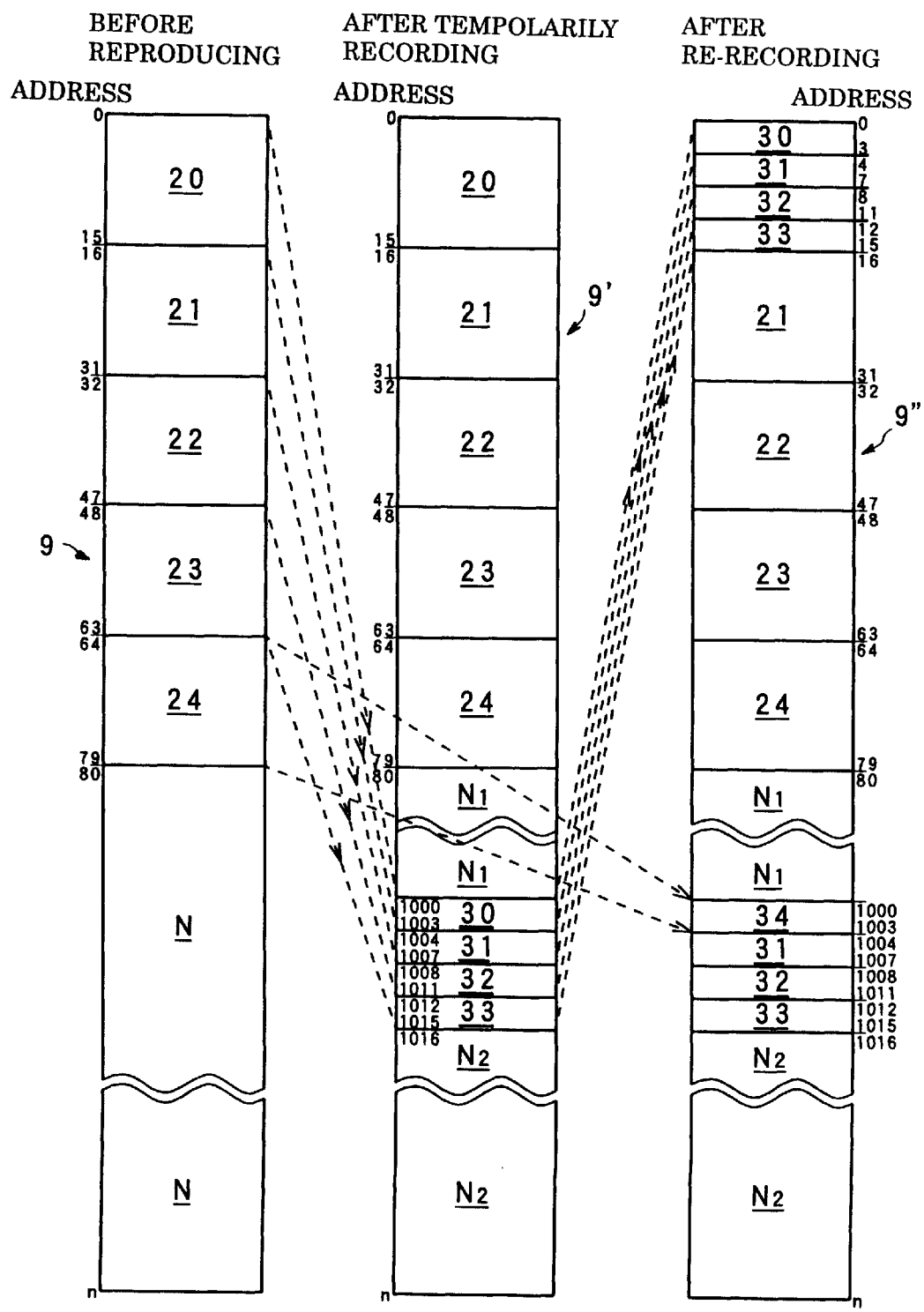
FIG. 7 is a diagram showing the record states of information before and after a re-recording operation of a fourth embodiment of the present invention.

FIG. 7 is a diagrammatic view showing the record states of information on the optical disc 9 before and after a re-recording operation of the fourth embodiment.

In the first to third embodiments, the case is described in which the information is not shifted on the optical disc 9' after the re-recording operation. In contrast, in the fourth embodiment, after the information after the compression is re-recorded, a record position of the information after the compression is shifted.

The configuration of an information recording and reproducing apparatus in the fourth embodiment is same as that of the information recording and reproducing apparatus S in the first embodiment. Thus, the explanation of the detailed portions is omitted.

As shown in FIG. 7, in the re-recording operation of the fourth embodiment, the operation similar to the re-recording operation of the second embodiment is firstly performed for the read blocks 20 to 23, and the optical disc 9' is created as shown in FIG. 7.

At this stage, the record blocks 30 to 33 after the compression of the information are recorded within a non-recorded area N on the optical disc 9 before the re-recording operation.

In the re-recording operation of the fourth embodiment, after that, even if the record blocks 30 to 33 are re-recorded at the position in the original read block 20, when a reproduction position is then shifted in such a degree that the information of the read block to be reproduced (in the case of FIG. 7, the read block 24) is not re-written, the operations except that of the step 3 in the re-recording operation of the first embodiment shown in FIG. 2 are performed for the record blocks 30 to 33. Then, a second re-recording operation is executed such that the leads of the record positions of the record blocks 30 to 33 become the lead of the record position of the original read block 20, as shown as an optical disc 9" in FIG. 7.

After the above-mentioned operations are performed for the read blocks 20 to 23, the re-recording operation is performed for the next read block 24. Accordingly, the corresponding record block 34 after the compression is re-recorded at the position at which the original record block 30 is recorded.

After that, the record position of the record block 34 is again shifted. Then, the record block 34 is re-recorded at a position of an address "16" shown on the right side of FIG. 7.

The above-mentioned re-recording operation is performed twice for all the read blocks.

In the fourth embodiment, the re-recording operation is performed twice for one read block, as mentioned above. As a result, the record blocks 30 to 34 are re-recorded in a line from the lead of the optical disc 9, as shown on the right side of FIG. 3.

As described above, according to the operations of the information recording and reproducing apparatus of the fourth embodiment, the reproduced information is re-recorded after the compression. Thus, it is possible to reduce the area on the optical disc 9 required to re-record the information after the reproduction.

Also, the information can be re-recorded without using two recorderes i.e., both the information reproducing apparatus and the information recording apparatus. Hence, the optical disc 9 for the information storage can be manufactured without the unnecessary occupation of the installation space.

Moreover, since one recording and reproducing unit 8 reproduces the information and re-records the information after the compression, this can miniaturize the information recording and reproducing apparatus S.

Furthermore, while the information after the compression is temporarily stored in the buffer 19, it is read out and re-recorded. Thus, even if the search of a record position is required when the information after the compression is recorded, it is possible to successively reproduce the information before the compression.

Also, the information after a new compression (in the case of FIG. 7, the record block 34) is re-recorded within the area on the optical disc 9 in which the information after the compression (in the case of FIG. 7, the record block 30) is tentatively recorded. Thus, the information after the compression can be re-recorded even if the non-recorded area N is not sufficiently present on the optical disc 9 before the re-recording operation.

Moreover, when the information is reproduced greater by a predetermined amount than the tentatively-recorded information after the compression, the tentatively-recorded information after the compression (in the case of FIG. 7, the record blocks 30 to 33) are re-recorded in the area on the optical disc 9 in which the reproduced information (in the case of FIG. 7, the read block 20) is recorded. Thus, the information immediately after the reproduction is never erased by the operation of recording the information after the compression. Hence, even if the occurrence of the power failure in the middle of the compression process of the information causes the compression process to be interrupted, the information to be compressed can be again reproduced to then resume the compression process.

Moreover, since the record medium used for the re-recording operation is the optical disc 9, it is possible to minimize the space required to storage the information.

In addition, it is assumed and described in the above-mentioned respective embodiments that all the information amounts within the respective read blocks 20 to 24 are equal to each other. However, other than it, video or audio information for each GOP (Group Of Picture) in video compression of a so-called MPEG (Moving Picture Experts Group) method may be contained in one block. Also, video or audio information within the VOBU (Video Object Unit) in a logical format of the DVD dedicated to reproduction (e.g., an optical disc dedicated to the reproduction on which the record capacity is about 7 times greater than that of a conventional CD) may be contained. In these cases, the information amounts in the respective read blocks are different from each other.

Also, the above-mentioned respective embodiments are designed such that in the multiplexer 7, while the multiplex signal Sm after the compression is temporarily stored in the buffer 19, it is outputted to the recording and reproducing unit 8. However, other than this design, the following configuration may be employed. That is, buffers are respectively mounted between the switch 3 and the video encoder 5 and between the switch 4 and the audio encoder 6. Then, the demodulation video signal Sdv or the demodulation audio signal Sda before the compression is transiently stored to successively read it out and respectively encode it.

In this case, while the demodulation video signal Sdv and the demodulation audio signal Sda which are reproduced from the optical disc 9 are temporarily stored, they are successively read out. Thus, even if the search of a reproduction position is required when the information is reproduced from the optical disc 9, it is possible to successively generate the information after the compression and then re-record it.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-248414 filed on Sep. 2, 1998 including the specification, claims, drawings and summary is incorporated herein by reference in its entirety.

What is claimed is:

1. An information recording and reproducing apparatus comprising:
   a reproducing device for reproducing information, which is recorded on a record medium in advance;
   a compressing device for compressing the reproduced information to reduce an information amount of the reproduced information and generating a compression information;
   a recording device for re-recording the generated compression information onto the record medium; and
   a controlling device for controlling said recording device to
      (i) temporarily record the generated compression information onto a second record position, which is within an area where the reproduced information has never been recorded,
      (ii) re-record the temporarily recorded compression information onto a first record position, which is within an already-recorded area on the record medium where the reproduced information has been recorded when said reproducing device finishes reproducing the information larger by a predetermined amount than the temporarily recorded compression information, and
      (iii) then record the compression information, which is newly generated by said compressing device, onto the second record position, which is within the area where the temporarily recorded compression information has been temporarily recorded.

2. The information recording and reproducing apparatus according to claim 1, further comprising a temporarily recording device for temporarily recording the generated compression information onto a second record position, which is within a area where the reproduced information has never been recorded, wherein
   the controlling device controls said temporarily recording device to record the compression information, which is newly generated by said compressing device, onto the second record position, which is within the area where the temporarily recorded compression information has been temporarily recorded.

3. The information recording and reproducing apparatus according to claim 1, wherein
   reproducing operation by the reproducing device and recording operation by the recording device are executed simultaneously and parallel to each other.

4. The information recording and reproducing apparatus according to claim 1, wherein
   the controlling device controls recording the temporarily recorded compression information onto the first record position such that the temporarily recorded compression information is recorded sequentially from a lead position of the already-recorded area on the record medium in which the reproduced information has been recorded.

5. An information recording and reproducing apparatus comprising:
   a reproducing device for reproducing information, which is recorded on a record medium in advance;
   a compressing device for compressing the reproduced information to reduce an information amount of the reproduced information and generating a compression information;
   a recording device for re-recording the generated compression information onto the record medium; and
   a controlling device for controlling said recording device to
      (i) temporarily record the generated compression information onto a second record position, which is within a area where the reproduced information has never been recorded,
      (ii) re-record the temporarily recorded compression information onto a third record position, which is within a non-recorded area on the record medium where the reproduced information has been not recorded when said reproducing device finishes reproducing the information larger by a predetermined amount than the temporarily recorded compression information, and (iii) then record the compression information, which is newly generated by said compressing device, onto the second record position, which is within the area where the temporarily recorded compression information has been temporarily recorded, wherein the controlling device controls recording the temporarily recorded compression information onto the third record position such that the temporarily recorded compression information is recorded sequentially from a lead position of the non-recorded area on the record medium in which the reproduced information has not been recorded, in the condition that the information is originally recorded on the record medium.

* * * * *